Dec. 6, 1949     P. E. CREIGHTON     2,490,747
INFINITY SIGHT USING A TRANSPARENT REFLECTOR
Filed Aug. 6, 1946
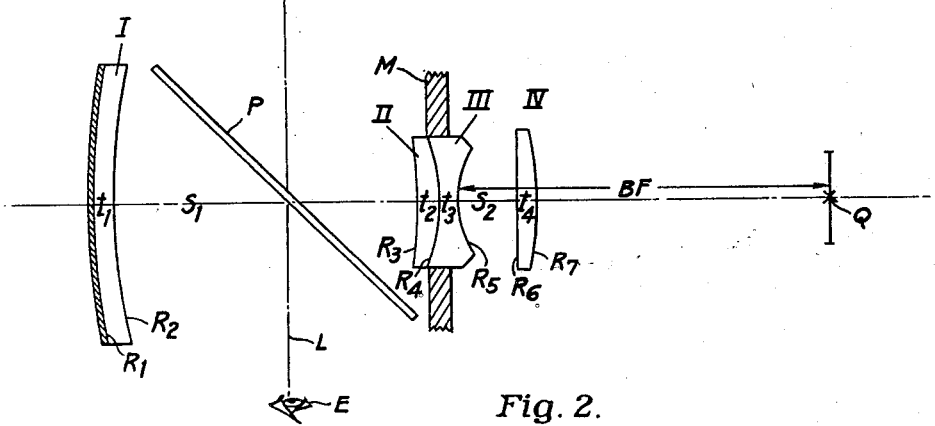
Fig. 1.
| EF = 100 mm. | | | | f/3.9 |
|---|---|---|---|---|
| LENS | $N_D$ | V | RADII | THICKNESSES |
| I | 1.517 | 64.5 | $R_1$ = + 72.40 mm. | $t_1$ = 2.28 mm. |
|  |  |  | $R_2$ = + 53.75 | $S_1$ = 27.67 |
| II | 1.689 | 30.9 | $R_3$ = − 56.98 | $t_2$ = 1.88 |
| III | 1.511 | 63.5 | $R_4$ = − 14.42 | $t_3$ = 1.41 |
|  |  |  | $R_5$ = + 10.20 | $S_2$ = 3.46 |
| IV | 1.523 | 58.6 | $R_6$ = + ∞ | $t_4$ = .71 |
|  |  |  | $R_7$ = − 123.21 * | BF = 26.71 † |
| * CYLINDRICAL SURFACE | | | † FROM LENS III TO FOCAL PLANE | |
Fig. 2.
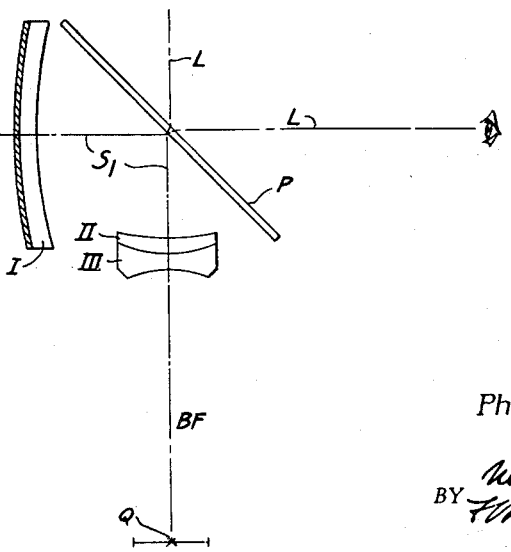
Fig. 3.
Philip E. Creighton
INVENTOR
BY *Newton M Perkins*
*F M Emerson Holmes*
ATTY & AG'T Patented Dec. 6, 1949

2,490,747

UNITED STATES PATENT OFFICE 2,490,747

INFINITY SIGHT USING A TRANSPARENT REFLECTOR

Philip E. Creighton, Rochester, N. Y., assignor to Eastman Kodak Company, Rochester, N. Y., a corporation of New Jersey Application August 6, 1946, Serial No. 688,591

3 Claims. (Cl. 88—2.3)

This invention relates to infinity sights for aiming guns, cameras, and the like.

An object of the invention is to provide an improved infinity sight which is compact and which projects a sharp virtual image of the reticle onto a flat field at infinity.

Infinity sights consist of a reticle or other pattern at the principal focus of an optical system and optical means such as a semi-transparent mirror for viewing the distant target and simultaneously viewing the pattern through the optical system so that the two appear superimposed at infinity. This optical means is similar to a beam splitter and is known as a beam combiner.

In the type of infinity sight to which this invention particularly relates, the optical system comprises a concave mirror and a negative lens component optically aligned between the mirror and the focal plane thereof. The mirror is preferably of the well-known Mangin type, which is a back-silvered mirror the front surface of which is from 1.25 to 2.0 times as strongly curved as the silvered surface. The mirror can be made of any stable optical glass, but it is known to all skilled in optical design that low-dispersion glass introduces the least chromatic aberration. Known low-dispersion glasses range from about 1.4 to about 1.65 in refractive index. The spherical aberration can be corrected to a very high degree in this (Mangin) type of mirror. The negative component is analogous to the negative component of an ordinary telephoto lens, and makes the system more compact for any stated focal length.

A semi-transparent mirror which constitutes the beam combiner is placed in front of the concave mirror usually at about 45° to the axis so as to combine the two beams of light, that from the reticle collimated by the optical system and that from the distant target.

According to the present invention, the curvature of field and chromatic aberration are very highly corrected by a particular structure of the negative component so that the distant image of the reticle appears sharp and flat at infinity and sensibly free from colored fringes.

I have found that this result is best gained by making the negative component a biconcave cemented doublet consisting of a positive element of high refractive index, i. e. about 1.6 to 1.85, facing the mirror and a biconcave element of much lower refractive index and dispersion facing the reticle, the two elements differing in refractive index by more than 0.12 and less than 0.30 and differing in dispersive index by more than 20. The negative component may advantageously be placed at a distance of about 0.2 F to 0.4 F from the mirror, where F is the focal length of the system.

In regard to the curvatures of the various surfaces, I find that the objects of the invention are best attained by making the radius of curvature of the silvered surface between 0.65 F and 0.8 F, that of the front surface of the mirror between 0.6 and 0.8 times that of the silvered surface, that of the lens surface facing the mirror between 0.5 F and 0.65 F, and that of the lens surface facing the reticle between ⅓ and ⅛ times that of the surface facing the mirror. It is well known that in corrected optical systems the optimum radius of curvature of a cemented surface is usually closely related to the difference in refractive indices at that surface. In the present instance, the optimum radius of curvature of the cemented surface is between one and three times the product of the index difference times the radius of curvature of the lens surface facing the mirror.

In the accompanying drawing

Figs. 1 and 2 show an infinity sight according to the invention and structural data for the same.

Fig. 3 shows a substantially equivalent arrangement.

The table of data is repeated here for convenience.

EF = 100 mm.   f/3.9

| Lens | $N_D$ | V | Radii | Thickness |
|---|---|---|---|---|
| I | 1.517 | 64.5 | $R_1 = +72.40$ mm.<br>$R_2 = +53.75$ | $t_1 = 2.28$ mm.<br>$s_1 = 27.67$ |
| II | 1.689 | 30.9 | $R_3 = -56.98$ | $t_2 = 1.88$ |
| III | 1.511 | 63.5 | $R_4 = -14.42$<br>$R_5 = +10.20$ | $t_3 = 1.41$<br>$s_2 = 3.46$ |
| IV | 1.523 | 58.6 | $R_6 = \infty$<br>$R_7 = -123.21$ [1] | $t_4 = .71$<br>$BF = 26.71$ [2] |

[1] Cylindrical surface.
[2] From lens (3) to focal plane.

In this table the indices $N_D$ and V of the glass are given in the customary way and the radii R, thickness $t$, and spaces $s$ are each numbered in order from the silvered surface $R_1$ of the mirror toward the back focal plane. The negative values of radii indicate surfaces convex toward the focal plane.

In Fig. 1 a divergent beam of light from a reticle Q is rendered further divergent by the negative lens II and III and then passes through a semi-transparent diagonal plate P before reaching a concave mirror I. The plate P introduces some undesirable astigmatism, depending upon its thickness. However, the astigmatism is corrected by a cylindrical lens IV near the negative components II and III. Alternatively there are very thin optical pellicles which are available on the market and which may be used in place of the plate and thus make the cylindrical lens IV unnecessary. Thus the cylindrical lens IV may be regarded as mere auxiliary, and accordingly the back focal length is given in the table of data as measured from the rear of the negative component, that is to say from surface $R_5$. The negative component may conveniently be mounted in a threaded ring M for adjusting the focus during assembly.

For the particular use for which this system was designed, a plate was preferred instead of a pellicle because of its greater mechanical strength. For a plate 1.56 mm. thick, a 4¼ diopter cylindrical lens placed about 3.5 mm. behind the negative component was found to substantially correct the astigmatism.

In use, the line of sight L from the eye E to the distant target is usually horizontal and the axis of the optical system substantially perpendicular thereto, either horizontal (i. e. at the side) or vertical.

It is well known that (in instruments of this kind) there are always two arrangements which produce substantially the same optical effect, and even more if one considers oblique axes. The second arrangement is shown in Fig. 3. It has the optical advantage that the divergent rays do not traverse the plate P until after the beam is collimated by the concave mirror I. Thus the beam is free of axial astigmatism, but on the other hand it has the practical disadvantage that the observer does not look in the actual direction of the distant target.

I claim:

1. An infinity sight having an optical system, a reticle in the focal plane of the optical system, and a beam combiner positioned to receive light from the reticle collimated by the optical system and to combine it with a substantially parallel beam from a distant target, said optical system comprising a back-silvered concave mirror facing the beam combiner and a biconcave lens component between the beam combiner and the reticle, the front surface of the mirror being between 1.25 and 2.0 times as strongly curved as the silvered surface, characterized by the biconcave component consisting of a positive meniscus element whose refractive index is between 1.6 and 1.85 facing the mirror and a biconcave element cemented thereto whose refractive index is less by between 0.12 and 0.30 and whose dispersive index is at least 20 greater than that of the meniscus element, by the curvature of the surface facing the reticle being from three to eight times that of the surface facing the beam combiner, and by the latter surface having a radius of curvature between 0.65 and 0.8 times the focal length of the optical system as a whole.

2. An infinity sight having an optical system, a reticle in the focal plane of the optical system, and a beam combiner positioned to receive light from the reticle collimated by the optical system and to combine it with a substantially parallel beam from a distant target whereby an image of the reticle appears superimposed on the distant target, said optical system comprising a back-silvered concave mirror facing the beam combiner and a biconcave cemented doublet between the beam combiner and the reticle, the cemented surface being positive in power and convex toward the reticle, in which system the refractive indices N, the dispersive indices V and the radii of curvature R of the mirror and the doublet, each numbered by subscripts from the silvered surface toward the reticle, are within the limits defined as follows:

$$1.4 < N_1 < 1.65$$
$$1.6 < N_2 < 1.85$$
$$(N_2 - 0.30) < N_3 < (N_2 - 0.12)$$
$$V_3 > (V_2 + 20)$$
$$0.65\,F < R_1 < 0.8\,F$$
$$0.6 R_1 < R_2 < 0.8 R_1$$
$$0.5\,F < R_3 < 0.65\,F$$
$$(N_2 - N_3) R_3 < R_4 < 3(N_2 - N_3) R_3$$
$$(R_3/8) < R_5 < (R_3/3)$$

where F is the focal length of the system, and the optically equivalent distance between the mirror and the doublet is between 0.2 F and 0.4 F.

3. An infinity sight having an optical system comprising a back silvered mirror, a biconcave cemented doublet optically aligned between the mirror and the focal plane of the system, a beam combiner optically aligned between the mirror and the doublet, and a reticle in said focal plane, the mirror and the doublet being made substantially according to the following specifications:

| Lens | $N_D$ | V | Radii | Thicknesses |
|---|---|---|---|---|
| 1 | 1.52 | 65 | $R_1 = +0.72\,F$<br>$R_2 = +0.54\,F$ | $t_1 = 0.02\,F$<br>$s = 0.28\,F$ |
| 2 | 1.69 | 31 | $R_3 = -0.57\,F$ | $t_2 = 0.02\,F$ |
| 3 | 1.51 | 64 | $R_4 = -0.14\,F$<br>$R_5 = +0.10\,F$ | $t_3 = 0.01\,F$ | wherein the optical elements are numbered in order in the first column, wherein lens 1 is the mirror and is silvered on its back surface $R_1$ and lenses 2 and 3 are the elements of the doublet, wherein the refractive index $N_D$ for the D line of the spectrum and the dispersive index V are given for the optical elements numbered in the first column, wherein the radii R and the thicknesses $t$ are numbered by subscripts from the silvered surface toward the focal plane, the + and − values of the radii denoting surfaces respectively concave and convex toward the focal plane, and wherein $s$ is the optical distance between the mirror and the doublet.

PHILIP E. CREIGHTON.

REFERENCES CITED

The following references are of record in the file of this patent:

UNITED STATES PATENTS

| Number | Name | Date |
|---|---|---|
| 1,967,215 | Acht | July 24, 1934 |
| 2,141,884 | Sonnefeld | Dec. 27, 1938 |
| 2,358,316 | Chwalow | Sept. 19, 1944 |
| 2,405,063 | Sisson | July 30, 1946 |
| 2,406,807 | Colbath | Sept. 3, 1946 |